June 29, 1965     C. B. GWYN, JR     3,191,272
METHOD OF MAKING AN ELECTRICAL CONTACT
Filed March 2, 1960     2 Sheets-Sheet 1
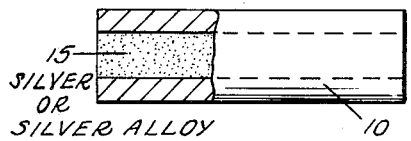
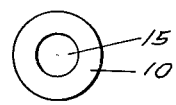
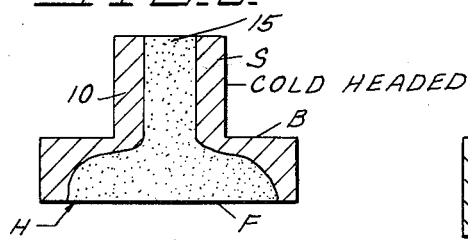
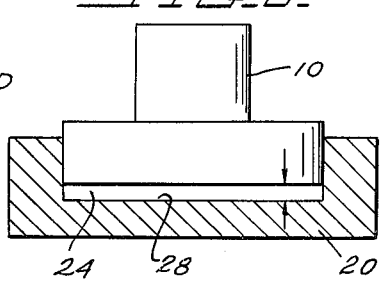
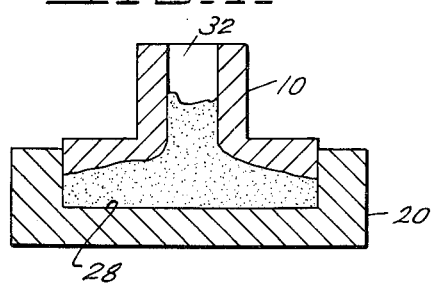
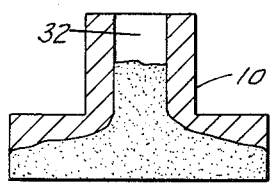
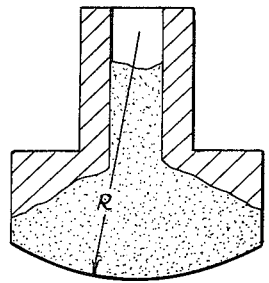
INVENTOR.
CHILDRESS B. GWYN, JR.
BY
OSTROLENK, FABER, GERB & SOFFEN
ATTORNEYS

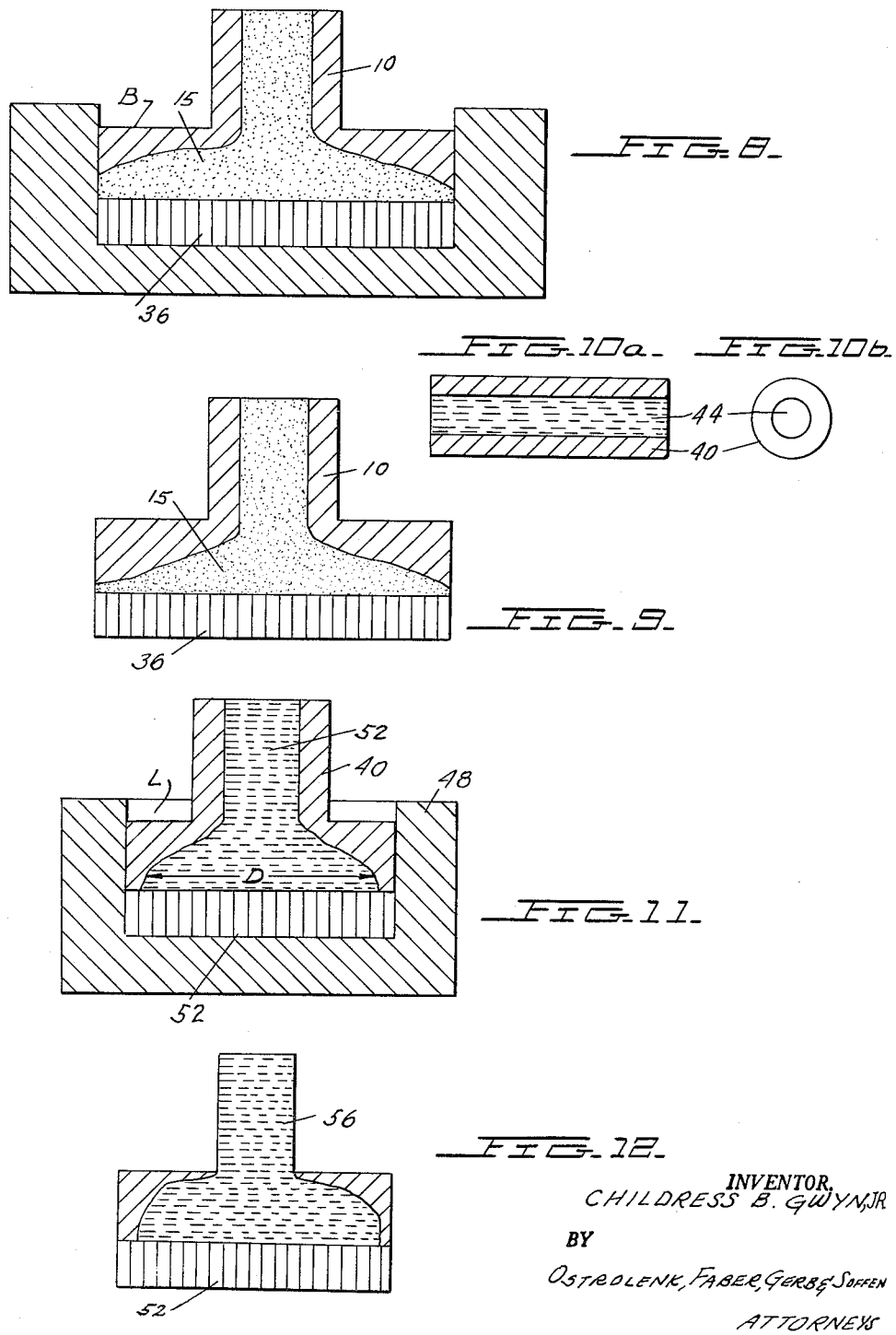

3,191,272
METHOD OF MAKING AN ELECTRICAL CONTACT
Childress B. Gwyn, Jr., Export, Pa., assignor, by mesne assignments, to Talon, Inc., a corporation of Pennsylvania
Filed Mar. 2, 1960, Ser. No. 12,354
4 Claims. (Cl. 29—155.55)

This invention relates to electrical contact rivets and more particularly to contact rivets made of composite metal components.

The prior art has produced clad composite contact rivets by brazing, welding or the so called "puddling" of separate working faces of various contact materials to base metal backings. In such instances this has generally required at least three, and never less than two individual component materials. As examples, a silver contact working face material, attached to a steel rivet backing by brazing requires an intermediate layer of a brazing or soldering medium. While this same silver disk may also be electrically welded directly to a steel rivet backing, such procedures require extremely close control and costly equipment and are relatively slow processes. Likewise puddled or fused contacts which are produced according to the teaching of my prior Patents Nos. 2,049,771 and 2,199,240, require the use of at least two separate components comprising a disk or other suitable body of the desired contact facing composition and a separate rivet backing of a higher melting point refractory or semi-refractory material. Furthermore, contacts so produced often require additional finishing or sizing operations to meet dimensional specifications plus an initial additional operation comprising the electroplating of the refractory metal backings.

An object of my present invention is to eliminate the necessity for handling several separate components and another object is to eliminate an initial electroplating of the refractory metal rivet backings, along with the special control equipment required.

Another object of my invention is to provide an electrical contact rivet which is strong and durable and one which may be economically manufactured.

It is yet another object of the invention to provide an electrical contact rivet which will not require additional finishing or sizing operations nor initial electroplating nor any particular control equipment.

The simplification of prior art procedures is brought about in the present invention by making a rivet from a composite member of two materials of dissimilar melting points. Thus, a semi-refractory cylinder of nickel or ferrous or relatively high melting point metal surrounding a core of silver or silver alloy of lower melting point. Such a composite member can be cold headed to form a rivet head and thereafter heated with one end held in a suitable mold so that the silver in melting, flows into the mold to take the shape thereof, thereby forming a contact working face material for the rivet. Or, by placing a facing element, say of sintered tungsten within the mold, the molten silver flowing thereon interlocks by infiltration in the pores thereof and the resultant article is an electrical contact rivet having a strong ferrous body as the shank and as base portion of the head with a highly electrical conductive silver or silver alloy connection between the tungsten contact facing and the nickel or ferrous shank. Conversely, the initial member may be formed as a cylindrical jacket of silver with a core of reinforcing steel or other metal cheaper and stronger than the silver. In either case, the reinforcing component not only forms a carrier for the meltable component, namely, the silver, but makes the entire method simple and provides for ease of manufacture as well as effecting a final strong product.

A detailed description of the invention will now be given in conjunction with the appended drawing, in which:

FIGURE 1a shows a longitudinal cross section of a member comprises of two metals of dissimilar melting points.

FIGURE 1b is an end view thereof.

FIGURE 2 shows in cross-section the composite member after an initial step of cold heading.

FIGURE 3 shows partially in cross-section an initial step of placing the cold-headed member in the cavity of a mold prior to heating.

FIGURE 4 shows in cross-section the result of heating the member within the mold.

FIGURE 5 shows in cross-section the fully formed rivet withdrawn from the mold.

FIGURE 6 shows in cross-section a mold having a cavity of curved shape at the bottom thereof.

FIGURE 7 shows in cross-section a rivet as it would appear after being processed in the mold of FIGURE 6.

FIGURE 8 shows in cross-section the arrangement for utilizing a modified method wherein an additional facing element is added to the member.

FIGURE 9 shows a cross-section of the final article as produced by the latter method.

FIGURE 10a is a cross-section of an alternative arrangement of the metallic components for making the rivet.

FIGURE 10b is an end view thereof.

FIGURE 11 is a cross-section showing the member of FIGURE 10a in a mold for heat processing; and FIGURE 12 shows the final article in cross-section as effected in the mold of FIGURE 11.

Referring now to the drawing, FIGURES 1a and 1b show an elongated member having a jacket 10 of suitable, strong, semi-refractory metal, for example, steel or nickel, surrounding a core of silver or suitable silver alloy 15. Such member is preferably of cylindrical shape, as indicated. The core is provided in the jacket in any suitable, conventional manner as by melting the silver and filling the bored iron jacket therewith. The silver is, of course, of lower melting point than the jacket and forms a suitable bond with the surface of the bore therein so as to be retained for the purpose of my process by surface alloying thereto. In other words, the silver core may be melted without melting the jacket and caused to flow out of the jacket by gravity, in the carrying out of my process.

Referring now to FIGURE 2, it will be noted that the member has been given a generally rivet shape. This can be readily accomplished by conventional cold heading, wherein the member now effects a rivet head H and a shank S. It will be noted that the silver component has been spread substantially across the face portion F of the head, being backed by the expanded jacket material which forms a base B for the head, supporting the silver components. There is, of course, by virtue of the deformation of the metal components, a strong mechanical interlock therebetween, while at the same time, the surface of the silver core is alloyed to the contiguous surface of the bore of the shank. However, even without such alloying, the core and jacket components are strongly secured to each other by mechanical interlock due to inherent roughness of the interior of the bore in the jacket.

Referring now to FIGURE 3, there is provided a mold 20 which may be of a suitable refractory material, such as carbon, ceramic, and the like, having a higher melting point than the melting point of the silver component of the rivet. As shown, the headed rivet is held with the headed end in a cavity 24 of the mold spaced as by a suitable spacing indicated by the oppositely pointing arrows from the bottom 28. With the rivet thus positioned, heat is applied to the mold and the composite member in any conventional manner so as to effect melting of the silver core which flows by gravity and/or capillarity down into the cavity, thereby filling the cavity and taking the general shape thereof, as will be understood from FIGURE 4. The upper portion 32 of the jacket thus, of course, becomes emptied of silver and a tubular rivet results wherein the core material drops down to some level within the jacket, depending, of course, upon the volume initially effected between the rivet head and the bottom of the mold prior to melting and the volume of the core. Upon cooling, the rivet then has the general shape and conformation shown in FIGURE 5.

In FIGURE 6, a somewhat differently shaped bottom mold cavity is shown. Thus, the bottom may be spherical in shape with any suitable radius R and, as seen in FIGURE 7, the rivet processed therein will have a silver facing of the same spherical shape.

Referring now to FIGURE 8, the same general method is disclosed except for the fact that the bottom of the mold has had initially placed therein a preformed facing 36 of any porous material such as sintered or compressed tungsten, molybdenum, rhenium or carbides thereof or silver plus nickel in excess of 5 percent. In this embodiment the facing becomes the working face of the contact rivet. The initial cold heading of the rivet is such as to effect complete covering of the head thereof by the silver component 15 at the exterior surface so that the juncture between the silver and the tungsten components is preferably completely across the interface therebetween. Thus, as the mold and the rivet are heated, melting of the silver flowing downwardly infiltrates into the entire upper surface of the tungsten preformed element and interlocks in the pores thereof to form a strong mechanical bond over the entire area. As noted in FIGURE 9, the article resulting therefrom results in a tubular rivet having a strong shank and reinforcing base for the head coupled with a tungsten facing member, all mechanically interlocked in a single, strong, integral unit, with excellent conductive connection via the silver from the tungsten facing to the shank.

Thus, in accordance with the present invention the clad or cored body can be simultaneously infiltrated with and brazed to the sintered metal body. Quite often the sintered body may not contain all the silver desired, for example, a silver tungsten body may as sintered contain very little or be devoid of silver, and may then be supplied in whole or part by the silver core or cladding of the composite body. This action can also take place whether the sintered body is placed upon or below the clad or cored composite body.

In comparing the diameter of the bore in the rivet shanks of FIGURES 2 and 9, it will be noted that the diameter in FIGURE 9 is somewhat larger so that a larger silver core is used. This is, of course, advantageous in the cold heading operation so as to insure silver completely covering the reinforcing base of the rivet heading and fully contiguous with the surface of the tungsten element, as well as providing sufficient silver in molten condition to firmly interlock in the pores of the tungsten. On the other hand, such an amount of silver is not necessary in the form of the invention as shown in FIGURES 1a through 5, since the cold heading need not be carried out to the point where the silver fully covers the facing end of the rivet head. The melting step causes the silver to flow out to form the complete facing as shown in FIGURE 4.

Referring now to FIGURES 10a and 10b, there is disclosed an initial composite member wherein the jacket 40 may be of the lower melting point metal, while the core 44 higher melting point. In such an arrangement, following the step of cold heading as previously described, the rivet may be placed in the mold 48 with a preformed, sintered facing element 52 therebelow. It will be noted that the core portion 44 formed of the higher melting point metal is spaced from the walls of the cavity by that thickness of the lower melting point metal jacket 40 which is necessary to permit access of the latter component, upon melting, to engage and infiltrate the porous sintered facing 52. In order to provide for excess molten metal from the jacket, the mold cavity is of suitable depth as to leave a spacing L to be filled up by the molten metal, thus squaring off the base of the rivet head as exemplified in FIGURE 12. It will, of course, be appreciated that the particular dimensions and thicknesses of the metal components shown in the drawing are for illustrative purposes only, and that the spacing L can be made of suitable size so as to capture all of the molten metal flowing from the jacket, as the heating process takes place, thereby leaving a completely solid, unjacketed shank 56 of the higher melting point component.

From the foregoing description, it will be apparent that I have provided a solid, strong, integrally unified rivet by a simple series of conventional steps easily undertaken, such as cold heading, heating in a mold with or without an additional contact facing, and finally, cooling, wherein the initial member provided for the operation is a simple, composite structure comprising a jacket and a core, which jacket and core comprise metals of dissimilar melting points.

The metals, of course, need not be silver, steel and tungsten, but any suitable combination of other metals selected in accordance with the respective requirements, therefore, as described herein for silver, silver alloy, nickel, steel and tungsten.

Having thus described my invention, I am aware that various changes may be made without departing from the spirit thereof and accordingly I do not seek to be limited to the precise illustration herein given except as set forth in the appended claims.

I claim:

1. The method of making an electrical contact rivet which comprises:
   (a) providing a composite enlongated member of two metal components in continuity with each other, one of said components being in the form of a jacket substantially surrounding the other of said components defining a core within said jacket,
      (1) said core being constituted of a contact working face material having a first melting point and selected from the group consisting of silver and silver alloys, and
      (2) said jacket being constituted of a contact backing material having a second, higher melting point and being selected from the group consisting of nickel and ferrous metals;
   (b) applying pressure to one end of the composite member to form an enlarged rivet head thereon having a surface formed transversely of the length of the rivet, said surface being defined substantially entirely by said contact working face material;
   (c) mounting a preformed porous facing element constituted of a material selected from the group consisting of tungsten, molybdenum, rhenium, carbides of said metals and a mixture of silver and nickel in excess of 5%, adjacent and in proximity to said facing surface; and
   (d) heating the resulting assembly to melt said contact working face material and effect flow of the same into said porous contact facing element, thereby simultaneously brazing the composite rivet shaped member to the contact facing element and infiltrating said element with said contact working face material.

2. The method of making an electrical contact rivet which comprises:
   (a) providing a composite elongated member of two metal components in contiguity with each other, one of said components being in the form of a jacket substantially surrounding the other of said components defining a core within said jacket,
  (1) a first of said metal components being constituted of a contact working face material having a first melting point and selected from the group consisting of silver and silver alloys, and
  (2) the second of said metal components being constituted of a contact backing material having a second, higher melting point and being selected from the group consisting of nickel and ferrous metals;
(b) applying pressure to one end of the composite member to form an enlarged rivet head thereon having a surface formed transversely of the length of the rivet, said surface being defined at least in part by said contact working face material;
(c) mounting a pre-formed porous facing element constituted of a material selected from the group consisting of tungsten, molybdenum, rhenium, carbides of said metals and a mixture of silver and nickel in excess of 5%, adjacent and in proximity to said facing surface; and
(d) heating the resulting assembly to melt said contact working face material and effect flow of the same into said porous contact facing element, thereby simultaneously brazing the composite rivet shaped member to the contact facing element and infiltrating said element with said contact working face material.

3. The method as defined in claim 2, in which the core of the initial composite elongated member treated is constituted of a material selected from the group consisting of silver and silver alloys, in which the jacket of said member is constituted of a material selected from the group consisting of nickel and ferrous metals, and in which said porous contact facing element is constituted of tungsten.

4. The method as defined in claim 2 in which the core of the initial composite elongated member treated is constituted of a material selected from the group consisting of nickel and ferrous metal, in which the jacket of said member is constituted of a material selected from the group consisting of silver and silver alloys, and in which said porous contact facing element is constituted of tungsten.

References Cited by the Examiner
UNITED STATES PATENTS

| | | | |
|---|---|---|---|
| 1,162,339 | 11/15 | Coolidge. | |
| 1,181,741 | 5/16 | Coolidge | 200—166 X |
| 2,049,771 | 8/36 | Gwyn | 29—155.55 |
| 2,183,254 | 12/39 | Charlton. | |
| 2,199,240 | 4/40 | Gwyn | 200—166 |
| 2,247,829 | 7/41 | Ziegs | 29—106.6 |
| 2,421,047 | 5/47 | Wolfson | 29—502 |
| 2,433,903 | 1/48 | Hensel | 22—204 |
| 2,517,762 | 8/50 | Brennan | 22—204 |
| 2,568,242 | 9/51 | Matteson | 113—110 |
| 2,612,443 | 9/52 | Goetzel et al. | |
| 2,624,820 | 1/53 | Payette | 200—166 |
| 2,723,444 | 11/55 | Harvey. | |
| 2,739,370 | 3/56 | Cooney | 29—155.55 |
| 2,799,081 | 7/57 | Farnham. | |
| 2,925,647 | 2/60 | Jones et al. | |
| 3,034,202 | 5/62 | Graves. | |

FOREIGN PATENTS
203,904  10/08  Germany.

JOHN F. CAMPBELL, Primary Examiner.

MAX L. LEVY, WINSTON A. DOUGLAS, FRANK E. BAILEY, Examiners.